United States Patent [19]
LeRouzic

[11] 3,951,496
[45] Apr. 20, 1976

[54] MULTIPLE CONNECTION ELECTRICAL CONNECTOR DEVICE

[76] Inventor: Jean LeRouzic, 11, Rue de Bourgogne, 22300 Lannion, France

[22] Filed: Apr. 7, 1975

[21] Appl. No.: 565,620

[30] Foreign Application Priority Data
May 3, 1974  France .................. 74.15360

[52] U.S. Cl. .................. 339/19; 339/222
[51] Int. Cl.² .................. H01R 31/08
[58] Field of Search .................. 339/19, 222

[56] References Cited
UNITED STATES PATENTS
3,001,106  9/1961  Higgs .................. 339/17 C
3,054,078  9/1962  Baschkin .................. 339/19

FOREIGN PATENTS OR APPLICATIONS
280,003  5/1965  Australia .................. 339/19

Primary Examiner—Roy Lake
Assistant Examiner—Mark S. Bicks
Attorney, Agent, or Firm—Abraham A. Saffitz

[57] ABSTRACT

An electrical connector device comprising a number of H-shaped electrical conductor connecting elements each having four equipotential connection arms so as to embody two rows of connecting pins disposed parallel to one another and perpendicularly to a longitudinal axis. The connecting elements are secured to a solid insulating member in which their central parts are embedded.

1 Claim, 5 Drawing Figures

MULTIPLE CONNECTION ELECTRICAL CONNECTOR DEVICE

This invention relates to an electrical connection device, more particularly to a device for providing connections between the elements of an automatic telephone exchange.

Known pin connector devices have only single connection pins even though the same may be able to deal with several kinds of connection, such as plugging into a female connector, the winding of a wire, clipping and so on. The frequent requirement in many electrical facilities is for multipling the contacts, with the result that electrical connections, usually in the form of wires, tend to be provided between the pins which it is required to multiple to provide the required parallel outgoing lines. Such methods increase wiring, wire density and therefore the time taken to make the connection, and also reduce the reliability of the complete wired system.

The connector according to the invention obviates these disadvantages and provides a number of equipotential pins making it possible to have a number of outgoing lines at the same potential but without any need for wired connections between the pins.

The invention will be better understood from the following description and from the accompanying drawings wherein.

Like elements have like references throughout the drawings.

Figure 1:
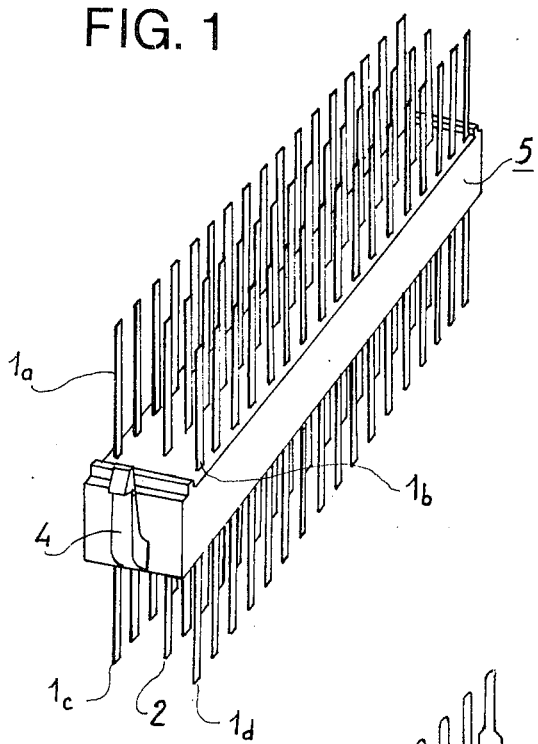
FIG. 1 shows a pin type connector unit having multipled contacts.
Figure 2:
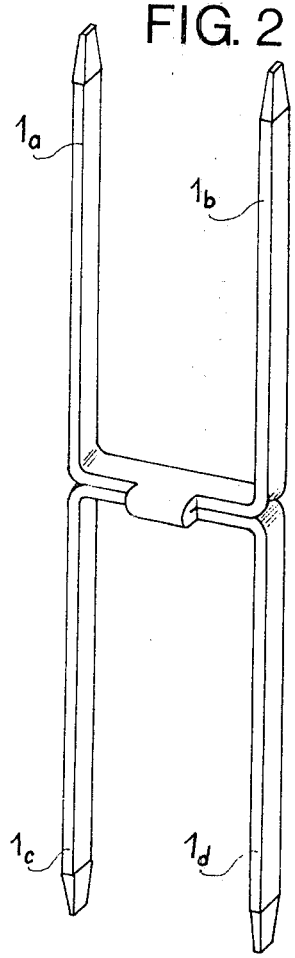
FIG. 2 shows an example of an H-shaped contact element used in the connector of FIG. 1.
Figure 5:
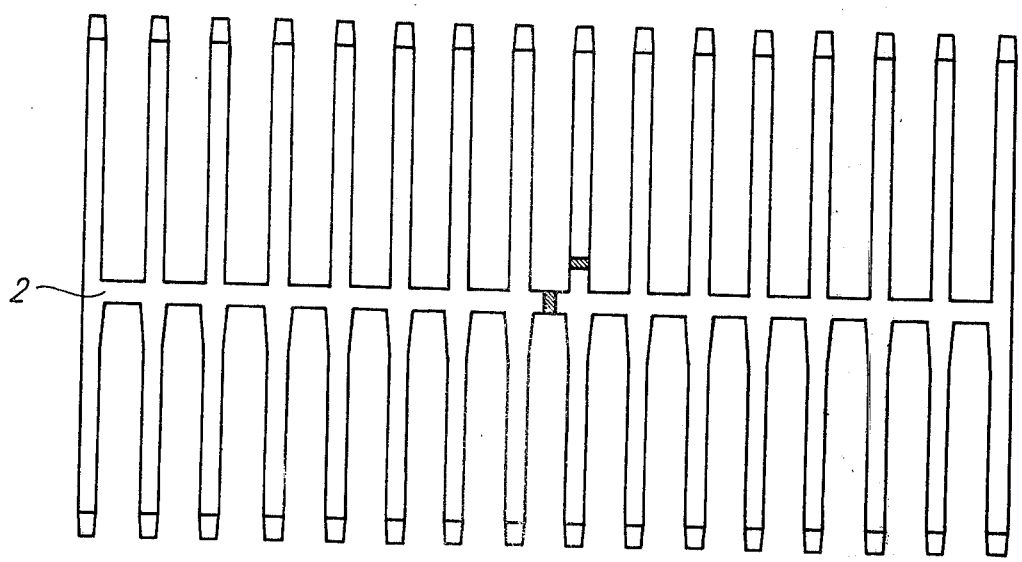
FIG. 5 shows a row of double equipotential pins used for forming the central pin system of the connector of FIG. 1.

Referring to FIG. 1, a connector 5 has a number of contact elements 1 each having 4 pins 1a, 1b, 1c, 1d in the form of an H, as shown in FIG. 2. The four pins 1a, 1b, 1c, 1d all form part of a single conductive member and so are equipotential. Connector 5 also has a central row of pins 2 which are in a vertical plane and which are all interconnected and therefore equipotential. The system of pins 2 is also shown in FIG. 5. In FIG. 1, there are 17 H-shaped contacts element and 32 pins 2 comprising 16 top pins and 16 bottom pins. These contact elements are disposed in a plastics member which makes it possible to have four pins of any element 1 available for each interconnection and for all the equipotential pins 2 to be connectable to wires which because of their destination should be at the same potential. The said member has a fixing or mounting member 4 enabling the connector 5 to be mounted or secured to any appropriate fixed member.

Figure 3:
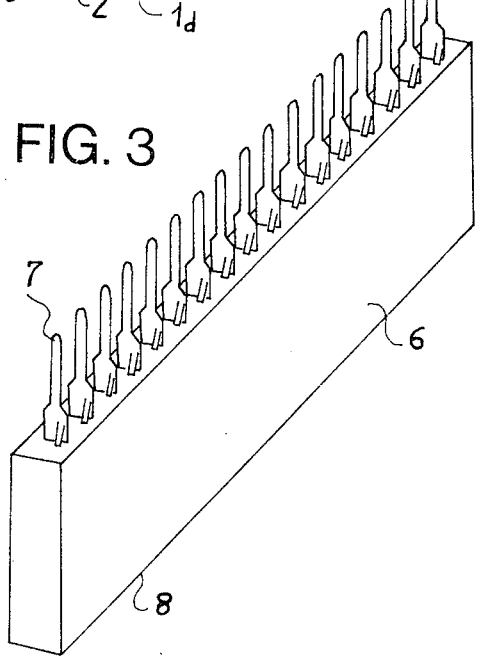
FIG. 3 shows a female pin type connector adapted to be connected to one of the series of lateral pins of the unit of FIG. 1.

FIG. 3 shows a female connector 6 adapted to be secured to any one of the four lateral rows of contact pins 1 of the connector 5. Connector 6 has pins 7 and is formed in its bottom surface 8 with apertures (not shown) electrically connected to the pins 7, the same engaging in a set of lateral pins of the contact elements 1. Four female connectors 6 can therefore be associated with any single connector 5.

Figure 4:
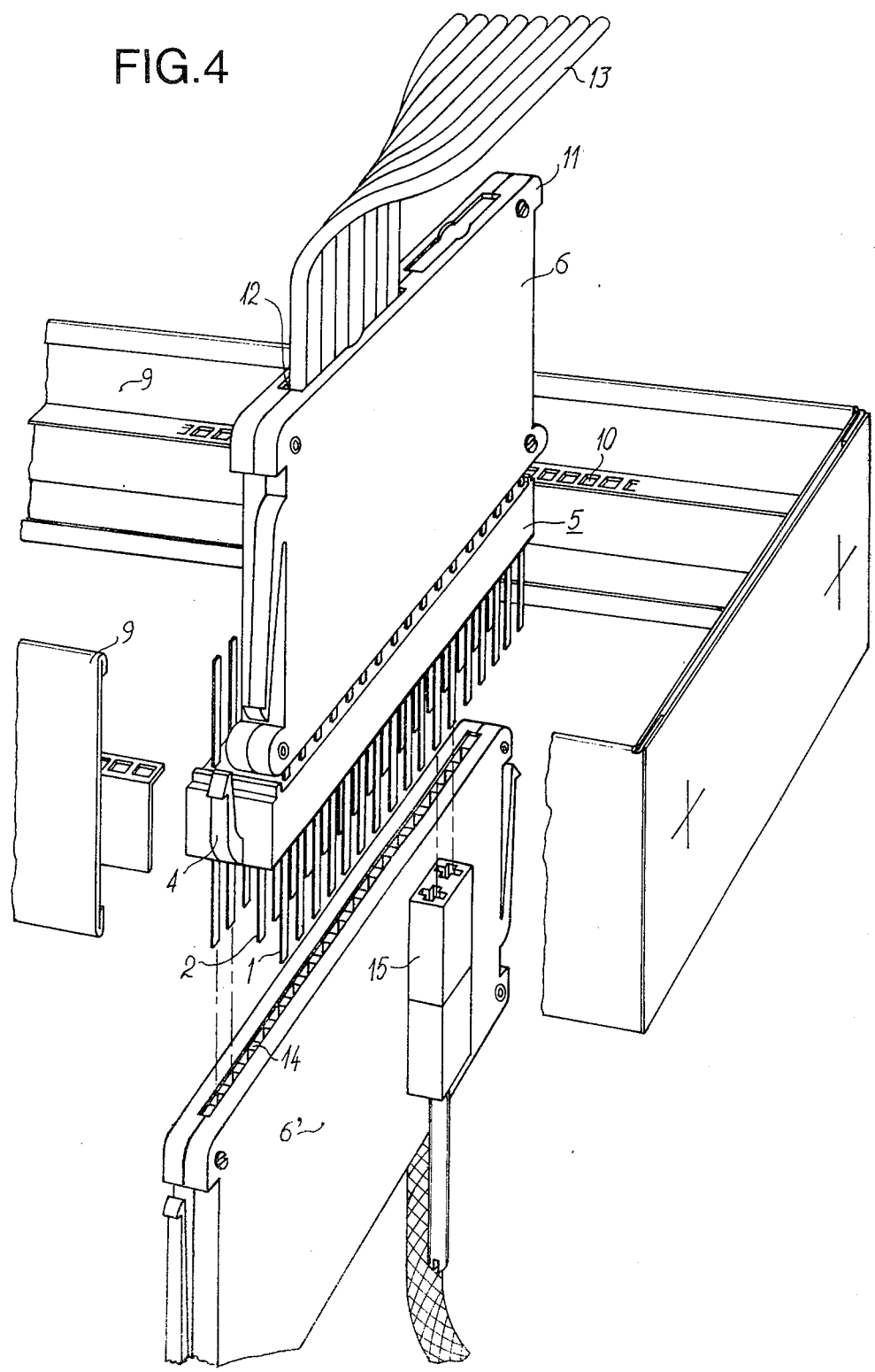
FIG. 4 is a diagrammatic view of an embodiment of a system of wired connections between the elements of an exchange unit, using the connections shown in FIGS. 1 and 3.

FIG. 4 is a diagrammatic view showing an embodiment of a system of wiring electrical connections between the various elements of a telephone automatic exchange. A fixed frame 9 is formed with apertures 10 in which a number of connectors 5 can be secured parallel to one another by means of their mounting device 4. Only one connector 5 is shown in FIG. 4 and it cooperates with a female connector 6 of the kind which is shown in FIG. 3 and which is disposed in a protective insulating cover or casing 11, the pins of connector 6 being connected to cable ends. Cover 11 is formed with top apertures 12, and a cable strand 13 extends through one of the apertures 12. Alternatively, the connecting unit could be directly connected to the cable ends by wound connections. The row 2 of 16 central double pins of the male connector 5 is adapted to receive the grounding wires present in some cables. Such a connection can be made e.g. by means of a female connector 6' which is similar to the connector 6 and which is formed with apertures 14 adapted to receive the pins 2. Also visible in FIG. 4 is a two-pin female connector (socket) 15 having a pin adapted to be connected to two pins 1 of the male connector 5.

As an example, an 1800-circuit automatic exchange serving 15,000 subscribers requires something like 500 male connectors 5.

Of course, the facilities hereinbefore described are of use in all wiring systems in which a number of pins are required for a single electrical contact and more generally in all bus wiring systems where connections are branched off from a main bus or line.

What I claim is:

1. An electrical multiple connecting unit comprising:
   an elongated solid insulating member along a central horizontal axis of said unit in which parts of the said unit are mounted;
   a plurality of H-shaped electrical conductor connecting elements in a row embedded in said solid insulating member with the transverse arm of the H-shaped element being transverse to said insulating member;
   each of said H-shaped elements having four equipotential connections arms and forming two rows of connecting pins which are disposed parallel to one another, one behind the other, and along said central longitudinal axis;
   said connecting unit also comprising a plurality of further straight connecting elements arranged in a further row and each spaced within the arms of the H-shaped elements so that each row of said further elements along the longitudinal axis is on an opposite side of said axis;
   the central parts of said straight connecting elements being embedded in said solid insulating member so as to form one row of connecting pins disposed on each side of said solid insulating member located between the arms of the H-shaped elements, said straight elements being electrically insulated from the H-shaped elements; and,
   at least one female connector engageable in a number of said parallel pins disposed in a single plane parallel to said longitudinal axis of the connecting unit.

* * * * *